Sept. 5, 1939.　　　P. B. PARKS ET AL　　　2,171,803
TEMPERATURE CONTROL SYSTEM
Filed July 13, 1935　　　2 Sheets-Sheet 1
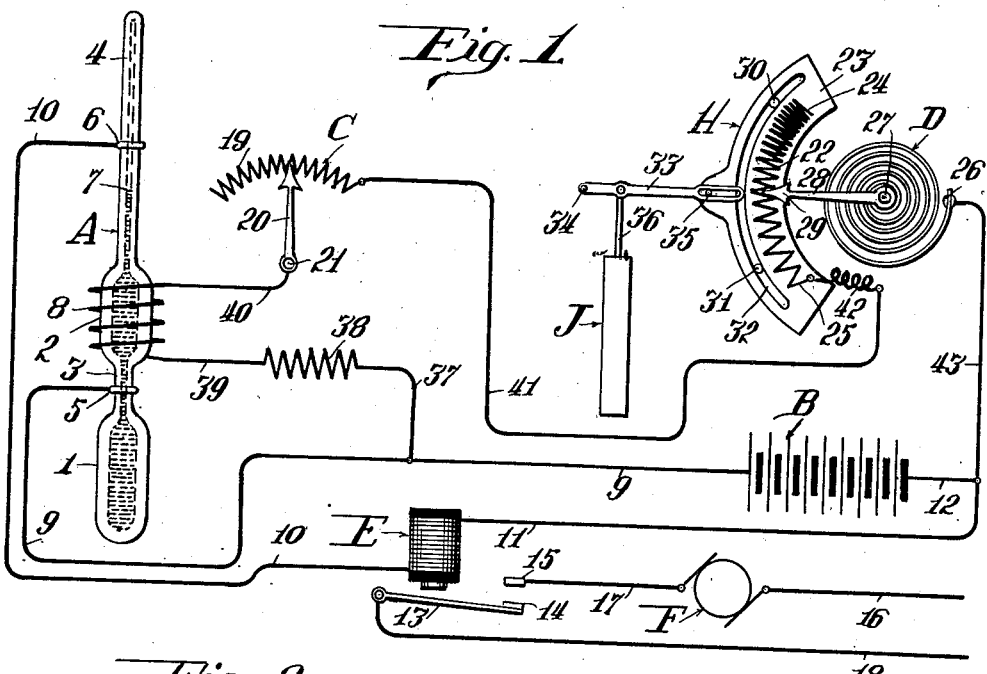
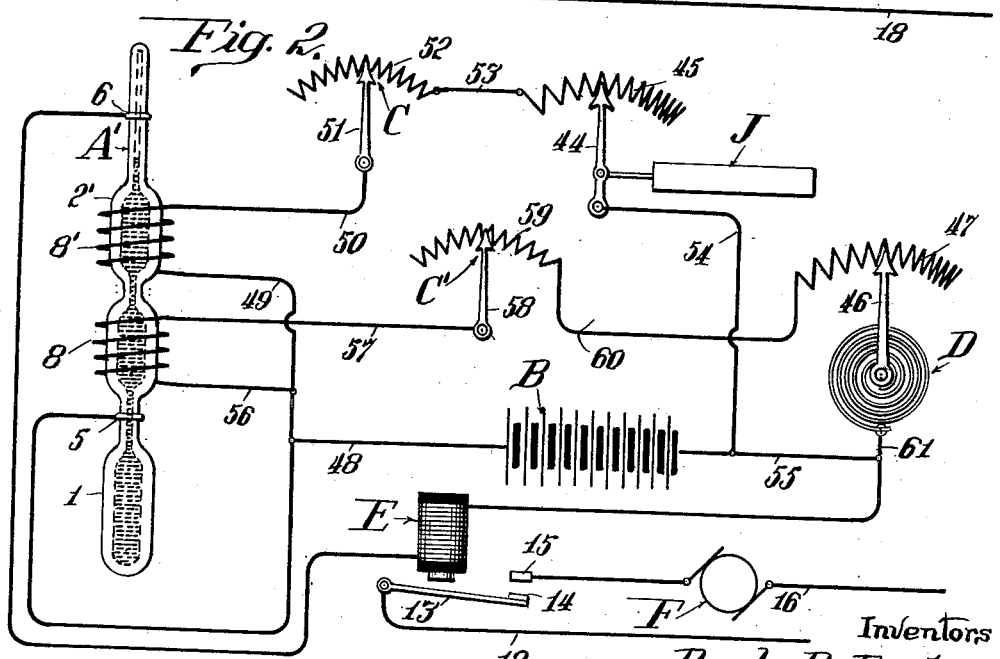
Inventors
Paul B. Parks
and Donald W. Miller
By Barnett & Truman
Attorneys

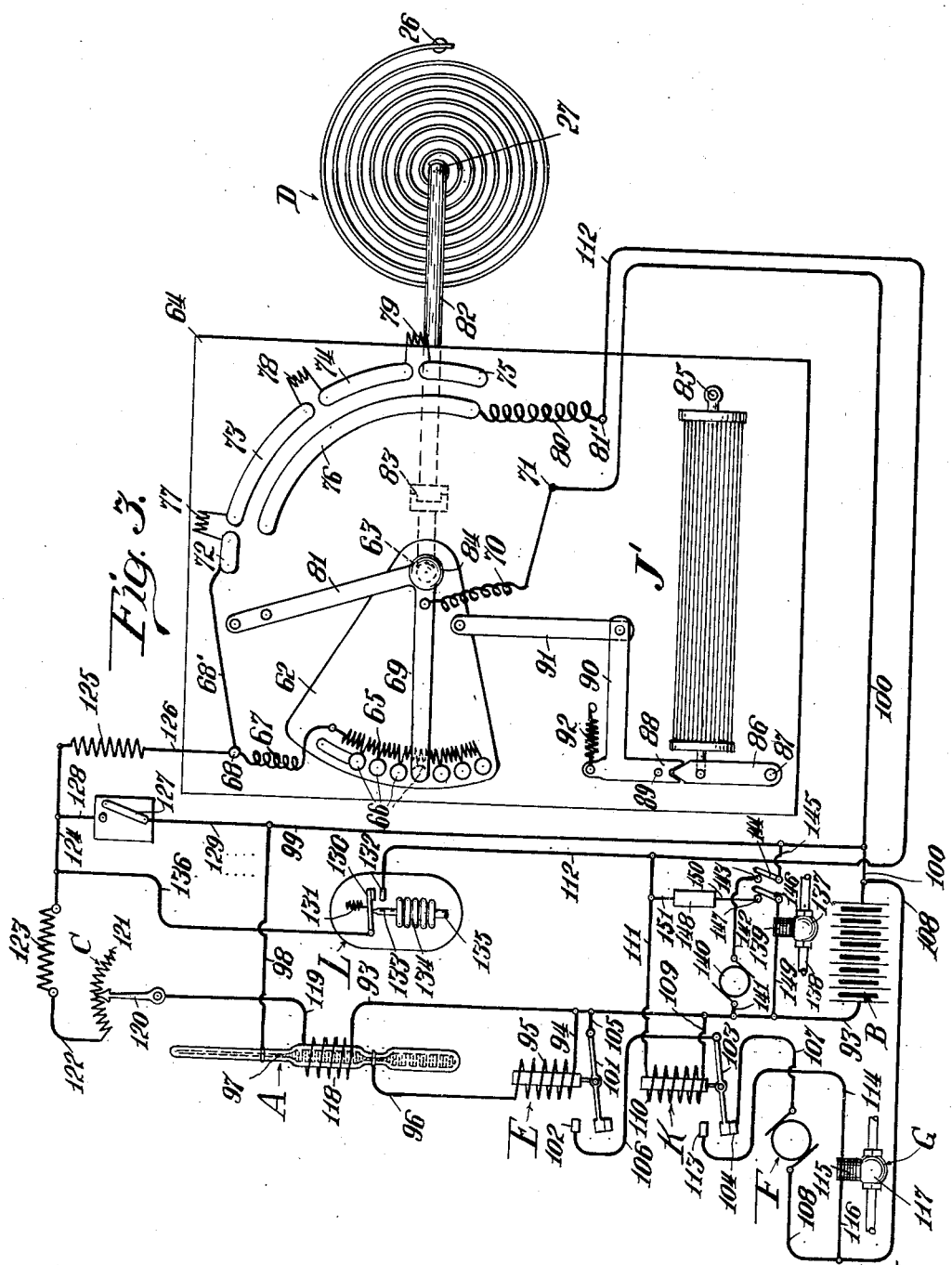

Patented Sept. 5, 1939

2,171,803

UNITED STATES PATENT OFFICE 2,171,803

TEMPERATURE CONTROL SYSTEM

Paul B. Parks, Oak Park, and Donald W. Miller, Elmhurst, Ill., assignors to Vapor Car Heating Company, Inc., Chicago, Ill., a corporation of New York Application July 13, 1935, Serial No. 31,190

8 Claims. (Cl. 257—3)

This invention relates to certain new and useful improvements in a system for controlling the temperature within an enclosure, and more particularly to improvements adapted to adjust the temperature maintained in the enclosure so as to compensate for changes in the relative humidity of the air, and also to compensate for changes in the temperature outside the enclosure.

Briefly described, these improvements are applied to a system in which either a heating or cooling means is controlled by a thermostat, preferably of the mercury column type, responsive to temperature changes within the enclosure. When a certain temperature is reached within the enclosure, the thermostat completes an electric circuit adapted to either start the operation of a cooling means, or stop the operation of a heating means. In order to adjust or change the temperature at which the thermostat will function, a heating element is positioned adjacent the thermostat so as to apply a predetermined heat correction thereto. Preferably this heating element is in the form of an electric coil, the amount of heat applied to the thermostat being determined by the strength of the current flowing through the coil which is adjusted by means of a rheostat or rheostats in the energizing circuit. According to the present invention, one or more of these rheostats is automatically adjusted by an element responsive to changes in the relative humidity of the air, or by a thermostatic element responsive to changes in the outside temperature, or cooperatively by both of these elements.

According to a further refinement of the invention, both a cooling means and a heating means are provided, one or the other of these means being selectively controlled by the automatically adjusted thermostat as the outside temperature rises above or falls below a certain predetermined temperature.

The principal object of this invention is to provide improved temperature control systems of the type briefly described hereinabove and disclosed more in detail in the specifications which follow.

Another object is to provide a temperature-controlling thermostat adapted to function at a temperature which is automatically determined in accordance with changes in the relative humidity of the air.

Another object is to provide a temperature controlling thermostat that will function at a temperature automatically determined in accordance with changes in the temperature outside the enclosure being heated.

Another object is to provide, in connection with both a heating means and a cooling means, a single automatically adjusted thermostat adapted to selectively control either the heating means or the cooling means in accordance with changes in the temperature exterior to the space being heated.

Another object is to provide improved means for controlling the humidity of the air within the enclosure when the heating system is in operation.

Other objects and advantages of this invention will be more apparent from the following detailed description of certain approved forms of mechanism constructed and operating according to the principles of this invention.

In the accompanying drawings:

Fig. 1 is a wiring diagram illustrating one embodiment of the invention.

Fig. 2 is a similar view showing a modified system.

Fig. 3 is a wiring diagram showing still another modification in which both heating, cooling, and humidifying means are used.

In each form of the invention here shown, the reference character A indicates the improved adjustable thermostat used inside the enclosure; B is the source of electrical power, here shown as a battery; C is a manually controlled rheostat; D is the thermostat responsive to outdoor temperatures, here shown as a coiled bi-metallic member; E is a relay controlled by thermostat A and functioning to open or close the energizing circuit for the heat-transfer device such as the cooling apparatus F of Figs. 1, 2 and 3, or the heating apparatus G of Fig. 3.

Referring first more specifically to Fig. 1, the thermostat A is of the mercury column type comprising the bulbs or reservoirs 1 and 2 connected by the tubular stem 3, and the main stem 4 extending upwardly from bulb 2 as in the ordinary thermometer. A fixed electrical contact 5 is so positioned as to be in constant engagement with the enclosed body of mercury. This contact may be conveniently positioned, as here shown in the stem 3 connecting the bulbs 1 and 2. A second contact 6 is positioned in the stem 4 at such a height that the mercury column 7 will contact therewith when the thermostat is subjected to some certain predetermined temperature. The bulb 1 is preferably exposed to a free circulation of air from within the enclosure so that the mercury within this bulb will respond promptly to changes in the inside temperature. A heating element 8, here shown as an electric heating coil, is positioned around the secondary bulb 2 so as to add a selected quantity of heat to the thermostat and thereby increase to a predetermined extent the height to which mercury column 7 will rise in the tube 4.

Let us assume, for example, that the mercury column 7 will make contact with the fixed contact member 6 when the thermostat is exposed to a temperature of 80° Fahrenheit, there being no current flowing in heating coil 8. Now let us suppose that sufficient current is directed through the heating coil 8 to raise the temperature of the mercury 5°, thus causing a corresponding additional elevation of the mercury column 7. Under these circumstances the mercury column 7 will contact the member 6 to complete the control circuit when the temperature within the enclosure to which the thermostat is subjected is 75° Fahrenheit, since an additional 5° elevation of the mercury column is added by the heating effect of coil 8. In a similar manner, by varying the strength of the current flowing through coil 8 and hence changing the temperature of the coil, the predetermined temperature at which the thermostat will function may be adjusted as desired within certain practicable limits.

In the case of a cooling or refrigerating system as here shown by way of example, when the desired maximum temperature is reached within the enclosure the mercury column 7 will engage the fixed contact 6 and complete a control circuit as follows: From battery B through wire 9, fixed contact 5, mercury column 7, fixed contact 6, wire 10, the coil of relay E, and wires 11 and 12 back to the battery. The energized relay E will attract the armature 13 and bring the contact 14 carried by this armature into engagement with a fixed contact 15 thus completing the refrigerating circuit as follows: From main wire 16 through refrigerating motor F, wire 17, relay contacts 15 and 14, armature 13, and wire 18 back to the source of power. The refrigerating apparatus will continue to operate until the temperature has been lowered within the enclosure so that mercury column 7 will descend out of engagement with fixed contact 6 whereupon the control circuit is broken, relay E is deenergized, and the refrigerating circuit is opened between contacts 14 and 15. If a heating system were to be controlled, the relay E would close a circuit functioning to shut off the supply of heat, the heat being automatically turned on when the relay is again deenergized.

The means by which the heating correction furnished by coil 8 is adjusted or predetermined, either manually or automatically, will now be described. The manually operated rheostat C comprises an arcuate resistance 19 along which the free end of a contact member 20 pivoted at 21 is adjusted to vary the amount of resistance in the heating circuit, as hereinafter described.

The automatically adjusted rheostat or resistance H comprises an arcuate resistance coil or similar resistance member 22 mounted on an arcuate supporting member 23. The resistance member 22 preferably has more coils or a greater resistance per unit of length near one end 24 than it has near the other end 25, and the resistance is graduated between these points as diagrammatically illustrated in the drawings.

The thermostat D is located outside of the enclosure, or is positioned in the path of the air stream drawn from outside the enclosure so as to respond to changes in outdoor temperature. One end 26 of the bi-metallic coil is fixed, whereas the movable inner end 27 is secured to the pivoted end of a contact arm 28, the free end 29 of which is movable along the arcuate resistance 22. Thermostat D is so constructed that as the outside temperature rises, the contact 29 will be moved in a clockwise direction, whereas when the outdoor temperature decreases the movable contact 29 will be moved in a counter-clockwise direction. The supporting plate 23 is slidable on a plurality of pins 30 and 31 extending through arcuate slot 32 in the plate, so that the plate and coil 22 can be moved lengthwise of its arcuate path of travel in either direction. The operating lever 33, pivoted at 34, has a pin and slot connection 35 with the arcuate supporting plate 23. Link 36 connects a shorter arm of lever 33 with the movable end of a humidity-responsive device J. This device J may comprise any suitable material (such as a block of wood, or strands of human hair) which will elongate as the humidity to which it is exposed increases, or contract as the humidity decreases. Such operating mechanisms are well-known in the art.

The circuit for energizing the heating coil 8 is as follows: From battery B through wires 9 and 37, fixed resistance 38, wire 39, heating coil 8, wire 40, movable contact 20 and selected portion of resistance 19 of rheostat C, wire 41, flexible connection 42, selected portion of resistance 22 and movable contact 28 of rheostat H, thermostat coil D, and wires 43 and 12 back to the battery. It will be apparent that the strength of the current flowing through heating coil 8 may be manually adjusted at any time by moving the contact arm 20 of rheostat C.

The automatically adjusted rheostat H is adapted to automatically increase or decrease the effect of the heating coil 8 so as to increase the comfort of the occupants of the enclosure that is being air-conditioned, for example the passengers in a railway car. It is not desirable to have too great a difference between the temperature within an enclosure that is being refrigerated and the temperature outside. For example, if the outdoor temperature is 80° Fahrenheit an inside temperature of 70° might be desirable, but if the outside temperature should rise to 90 there would be too great a difference in temperature if the inside temperature were maintained at 70° and it would be desirable, for example, to let the inside temperature rise to 75°. It will be remembered that the thermostat D moves the contact arm 28 in a clockwise direction as the outdoor temperature increases, thereby inserting a greater portion of resistance 22 in the energizing circuit. This will cut down the current flowing through heating coil 8 and thereby decrease the heat correction applied to thermostat A so that a higher temperature is permitted within the enclosure before the mercury column 7 will engage the fixed contact 6. As a consequence, the refrigerating device F will not be thrown into operation until a higher temperature is reached within the enclosure.

It is also well known that as the relative humidity of the air increases a lower temperature is more comfortable for the average human being, and as the air becomes drier a relatively higher temperature is desirable. It will be noted that as the relative humidity of the air increases the member J will elongate so as to shift the resistance 22 in a clockwise direction and decrease the amount of resistance in the heating circuit. This will increase the temperature correction so that thermostat A will function at a lower temperature, and consequently a lower temperature will be maintained within the enclosure by the refrigerating mechanism F. Conversely, as the relative humidity of the air decreases, more resistance will be inserted in the circuit and a relatively higher temperature will be permitted within the eclosure. By moving both the contact arm 28 and resistance 22, the amount of resistance in the circuit is varied both in response to temperature changes outside the enclosure, and in response to changes in the relative humidity within the enclosure, that is the temperature maintained within the enclosure is varied in response to changes in either or both of these conditions. It may be that a variation in one of these conditions may offset, in whole or in part, a change in the other condition so that the temperature maintained will remain substantially constant. This would result if the contact arm 28 and resistance 22 were simultaneously moved in the same direction, so that no material change would be made in the amount of resistance in the heating circuit.

In the modification shown in Fig. 2 the temperature corrections in response to variations in the relative humidity and the outside temperature are independently applied to the thermostat A'. The thermostat A' is shown as provided with two auxiliary bulbs 2 and 2' provided with heating coils 8 and 8' respectively. The humidity responsive member J moves a contact arm 44 lengthwise of a resistance 45 which may be similar to the resistance 22 shown in Fig. 1. Similarly, the outside thermostat D moves a contact arm 46 lengthwise of the resistance 47. Separate manually adjustable resistances C and C' may, if desired, be connected in series with each of these automatically adjusted resistances. The energizing circuit for heating coil 8' is as follows: From battery B through wires 48 and 49, heating coil 8', wire 50, contact arm 51 and selected portion of resistance 52 of rheostat C, wire 53, selected portion of resistance 45 and contact arm 44 of the humidity controlled rheostat, and wires 54 and 55 back to the battery. The energizing circuit for heating coil 8 is as follows: From battery B through wires 48, 49 and 56, heating coil 8, wire 57, contact arm 58 and selected portion of resistance 59 of rheostat C', wire 60, selected portion of resistance 47 and contact arm 46 of the outside-temperature controlled rheostat, and wires 61 and 55 back to the battery. The refrigerating mechanism is controlled from the thermostat A' in exactly the same manner as already described in connection with Fig. 1.

In the form of the invention shown in Fig. 3, both heating means and cooling means are used, both controlled by the single thermostat A, and the selection of which of these temperature maintaining means shall be operative at any one time is determined by changes in the temperature outside the enclosure. The swinging plate or sector 62 is pivoted about the axis 63 on the panel board 64. A resistance 65 carried by sector 62 is tapped off at intervals to an arcuate series of separate contacts 66, and one end of the resistance 65 is connected through flexible wire 67 with a terminal 68 on the panel board. A contact arm 69, also pivoted to swing about the center 63 but independently of the sector 62, is adapted to selectively make contact with the several contact members 66. A flexible conductor 70 connects contact arm 69 with a terminal 71 on the panel board. An arcuate series of contact plates 72, 73, 74 and 75 centered about axis 63 are mounted on the panel board 64, and a similar arcuate contact plate 76 of substantially the same arcuate length as the combined contacts 73, 74 and 75 is also mounted on the panel board. A resistance 77 has its ends connected with the contacts 72 and 73 respectively. Another resistance 78 is connected between the contacts 73 and 74, and a resistance 79 is connected between the contacts 74 and 75. Contact plate 76 is connected through conductor 80 with a terminal 81' on the panel board. Contact plate 72 is connected through conductor 68' with the terminal 68. Another contact arm 81 rigidly connected with contact arm 69 but angularly spaced therefrom is also adapted to swing about the center 63. Contact arm 81 is adapted to engage selectively with the several contact plates 72, 73, 74, 75 and 76. The contact arms 69 and 81 are adapted to be swung as a unit by the outside thermostat D through the flexible shaft or gearing indicated diagrammatically at 82. These connections may be disengaged by means of the clutch indicated diagrammatically at 83, and the contact arms 69 and 81 may be swung manually about the center 63 by any suitable means such as the knob 84. The humidity responsive member J' is anchored at one end 85 and its other movable end is connected with a lever 86 pivoted at 87, the free end of this lever engaging the short arm 88 of a second lever pivoted at 89, the long arm 90 of this lever being connected through link 91 with the swinging sector 62. The spring 92 tends to swing the sector 62 in a counter-clockwise direction as the member J' elongates when the humidity increases, and when member J' contracts due to a decreasing humidity the sector 62 will be swung in a clockwise direction. The contact arms 69 and 81 are swung in a counter-clockwise direction as the outside temperature increases, and are swung in a clockwise direction as the outside temperature decreases. With the parts in the position shown in Fig. 3 the outside temperature is warm and the themostat A is in control of the refrigerating apparatus.

When a certain predetermined temperature is reached within the enclosure that is being air-conditioned, the relay E will be energized through the following circuit: From battery B through wires 93 and 94, relay coil 95, wire 96, mercury column 97 of thermostat A, and wires 98, 99 and 100 back to the battery. When the relay E is thus energized, it will draw up the armature 101 into engagement with a fixed contact 102 so as to complete an operating circuit that will start the refrigerating system in operation or stop the operation of the heating system, depending upon which of these systems is adapted to function as determined by the outside temperature then prevailing. The selector relay K will be deenergized when the outside temperature is above some predetermined point (for example 68° Fahrenheit) at which time the armature 103 of this relay will be in engagement with the fixed contact 104. Under these circumstances the refrigerating apparatus F will be put into operation when the predetermined maximum temperature is reached at the thermostat A, over the following circuit: From battery B through wires 93 and 105, armature 101, fixed contact 102, wire 106, armature 103, fixed contact 104, wire 107, refrigerator motor F, and wires 108 and 100 back to the battery B. When the temperature has again been lowered within the enclosure below the predetermined maximum temperature, the control circuit which energizes relay E will be broken at the thermostat, whereupon this refrigerating circuit will be broken between the contacts 101 and 102.

If the temperature outside the enclosure falls below some predetermined temperature (for example 68° Fahrenheit as assumed above) the outside thermostat D will swing the contact arm 81 in a clockwise direction until it engages the arcuate contact plate 76. An energizing circuit for selector relay K will now be completed as follows: From battery B through wires 93 and 109, relay coil 110, wires 111 and 112 to terminal 81', conductor 80, contact plate 76, swinging contact arm 81, conductor 70, terminal 71 and wire 100 back to the battery. The energization of selector relay K will draw the armature 103 up into engagement with the fixed contact 113 and a control circuit for the heating system G will now be completed as follows: From battery B through wires 93 and 105, armature 101, fixed contact 102, wire 106, armature 103, fixed contact 113, wire 114, valve operating magnet 115, and wires 116, 108 and 100 back to the battery. The heat controlling mechanism G as here shown comprises a normally open valve 117 that is adapted to be closed by magnet 115. When the predetermined maximum temperature is reached at the thermostat A, the completion of the circuits as just described will cause the valve 117 to be closed thus cutting off the flow of heating medium to the heating system. When the temperature within the enclosure again falls so as to break the control circuit at the thermostat A, the magnet 15 will be deenergized and valve 117 will automatically reopen so as to again put the heating system into operation.

With the parts in the positions shown in the drawings, the heat-correction circuit for thermostat A is as follows: From battery B through wire 93, heating coil 118, wire 119, arm 120 and resistance 121 of the manually operated rheostat C, wire 122, fixed resistance 123, wire 124, resistance 125, wire 126, terminal 68, conductor 67, selected portion of resistance 65, contact arm 69, conductor 70, terminal 71 and wire 100 back to the battery. The amount of the resistance 65 that will be in circuit will depend upon the positions of contact arm 69 and sector 62 as determined by the outside temperature and the relative humidity of the air within the enclosure. The operation of this portion of the mechanism is substantially the same as already described in connection with Fig. 1. The heating current can also be adjusted manually by means of rheostat C.

If the outside temperature falls to some predetermined temperature, for example 70° Fahrenheit, the contact arm 81 will engage with fixed contact 72 thus shorting the circuit last described around any portion of resistance 65 which may at that time be in circuit. At this time, while it is still possible for the refrigerating apparatus to operate, the humidity adjustment is rendered temporarily ineffective.

If the outside temperature falls still further (for example to 68° Fahrenheit or below) the contact arm 81 will move into engagement with arcuate contact 73, and also into engagement with arcuate contact 76 so as to energize the selector relay K. The heating system will now be in operation. That portion of the circuit for energizing heating coil 118 that is positioned on panel board 64 will now be as follows: From terminal 68 through wire 68', contact plate 72, resistance 77, contact plate 73, arm 81, and conductor 70 to terminal 71. As the outside temperature falls still further, it may be desirable to maintain a still higher temperature in the vicinity of the thermostat A in order to compensate for additional heat losses from the enclosure. Accordingly, as contact arm 81 moves successively onto the contact plates 74 and 75, additional resistances 78 and 79 are inserted in the energizing circuit for heating coil 118, thus cutting down the heat correction applied to the thermostat A and permitting the inside temperature to rise somewhat higher before the control circuit through thermostat A is completed to close the valve G.

In some installations, for example in a Pullman car, it is desirable to maintain a lower temperature at night when the enclosure is used as a sleeping compartment. Accordingly, the night-switch 127 is provided in the shunt circuit comprising wire 128, switch 127, and wires 129 and 99, adapted to connect wire 124 directly with wire 100 and thus shunt out the resistance 125 and all of the resistances on the panel board 64. As a result, when switch 127 is closed a stronger current will flow through heating coil 118 and the thermostat A will operate to maintain a lower temperature. Also, in cold weather when a railway car is not in service it is unnecessary to maintain as high a temperature within the car but it is desirable to maintain a certain minimum temperature (for example 50° Fahrenheit) in order to prevent damage to the car or its contents. For this purpose the automatic selector switch L is provided. The swinging switch arm 130 will automatically close against fixed contact 132 under the influence of spring 131, but the switch contacts will normally be held open by plunger 133 extending from bellows motor 134 so long as air pressure is present in a service pipe on the car with which pipe connection 135 is connected. When the car is taken out of service, that is, is no longer connected in a train, the fluid pressure in the pipe line will be dissipated and bellows 134 will contract so as to permit the switch contacts 130 and 132 to close. As a result a shunt circuit cutting out the resistance 125 and all of the resistances on panel board 64 will be completed as follows: From wire 124 through wire 136, selector switch contacts 130 and 132, wire 112, conductor 80, contact plate 76, contact arm 81, conductor 70, and wire 100 to the battery. This automatic selector switch will only be effective when the heating system is in operation, but will act like the night switch 127 to increase the current flowing through heating coil 118 and thereby lower the temperature at which thermostat A will function to close the heating valve 117.

At 137 is indicated a normally closed valve adapted to control the flow of water to a humidifying apparatus, this valve adapted to be opened by a magnetic device 139. At 140 is indicated the motor of a blower device for circulating air through the humidifying apparatus. This motor is energized over the following circuit: From battery B through wires 93 and 141, motor 140, wire 142, switch contact 143, movable switch arm 144, and wires 145, 99 and 100 back to the battery. When switch arm 144 is closed to energize the blower mechanism, a second switch arm 146 will also be brought into engagement with a fixed contact 147. At 148 is diagrammatically illustrated a humidostat which is adapted to close a circuit when a minimum humidity is reached within the enclosure. The circuit thus completed is as follows: From battery B through wires 93 and 149, valve operating magnet 139, switch contacts 146 and 147, wire 150, humidostat 148, wires 151, 111 and 112, and thence as before through contacts 76 and 81 back to the battery B. By this means the humidity within the enclosure may be maintained above a certain predetermined minimum, but the valve 137 cannot be opened unless the blower fan is in operation.

It will be noted that in each form of the invention hereinabove disclosed, the controlling thermostat A is automatically adjusted in accordance with changes in the temperature outside of the enclosure, and also in accordance with changes in the relative humidity of the air within the enclosure, to the general end of maintaining a more comfortable temperature within the enclosure. In the Fig. 3 form of the invention, this same automatically adjusted thermostat is adapted, by means of an automatic selector mechanism controlled by outside temperatures, to control either a heating means or a cooling means so that the system will be operative throughout a wide range of temperatures. It is to be understood that the control system as shown in Fig. 3 is for seasonal use, that is only the cooling system or the heating system will be conditioned for operation at any one time. If, during the summer season when the cooling system is in operation, there should be steam in the heating supply pipe, then an additional cut-off valve will be used to prevent the steam from flowing into the radiators.

It will be understood that many of the features are merely shown diagrammatically and that no attempt has been made to illustrate the relative proportions of the several elements nor the proper values of the resistances involved. Since the actual movement of the humidity-responsive members J or J' is quite small, a suitable multiplying mechanism is necessary to impart the required movement to the resistances controlled thereby, and such multiplying mechanisms are merely shown diagrammatically by the leverage systems indicated.

We claim:

1. In combination with means for cooling an enclosure, a temperature controlling circuit, a thermostat responsive to temperature changes within the enclosure adapted to make and break said circuit, a heating coil adapted to directly and continuously apply heat to the thermostat so as to change the temperature which it will function to maintain within the enclosure, an energizing circuit for said coil, variable resistance means in the heating circuit for determining the heat developed in the heating coil, and means responsive to temperature changes outside the enclosure and to changes in the relative humidity of the air for increasing the resistance as the humidity decreases or the outside temperature rises, and decreasing the resistance as the humidity increases or the outside temperature falls.

2. In combination, means for maintaining a desired temperature within an enclosure comprising a heating means and a cooling means, means operating in response to changes in temperature outside the enclosure for selecting for operation either the heating means or the cooling means, a thermostat within the enclosure adapted to control the operation of the selected heating or cooling means in accordance with temperature changes inside the enclosure, a heating coil to directly and continuously apply a predetermined heat correction to the thermostat so as to select the temperature which it will function to maintain within the enclosure, an energizing circuit for said coil, a variable resistance in this heating circuit for determining the heat developed in the heating coil, the means responsive to temperature changes outside the enclosure functioning when the cooling means is in operation to increase the resistance as the outside temperature rises and decreases the resistance as the outside temperature falls.

3. In combination, means for maintaining a desired temperature within an enclosure comprising a heating means and a cooling means, means operating in response to changes in temperature outside the enclosure for selecting for operation either the heating means or the cooling means, a thermostat within the enclosure adapted to control the operation of the selected heating or cooling means in accordance with temperature changes inside the enclosure, a heating coil adapted to directly and continuously apply heat to the thermostat so as to select the temperature which it will function to maintain within the enclosure, an energizing circuit for said coil, a variable resistance in this heating circuit for determining the heat developed in the heating coil, and means responsive to changes in the relative humidity of the air and functioning when the cooling means is in operation to decrease the resistance as the humidity increases and increase the resistance as the humidity decreases.

4. In combination, means for maintaining a desired temperature within an enclosure comprising a heating means and a cooling means, means operating in response to changes in temperature outside the enclosure for selecting for operation either the heating means or the cooling means, a thermostat within the enclosure adapted to control the operation of the selected heating or cooling means in accordance with temperature changes inside the enclosure, a heating coil adapted to directly and continuously apply heat to the thermostat so as to select the temperature which it will function to maintain within the enclosure, an energizing circuit for said coil, a variable resistance in this heating circuit for determining the heat developed in the heating coil, and means responsive to changes in the relative humidity of the air cooperating with the means responsive to temperature changes outside the enclosure when the cooling means is in operation to increase the resistance as the humidity decreases or the outside temperature rises, and to decrease the resistance as the humidity increases or the outside temperature falls.

5. In combination, a temperature controlling circuit, a thermostat responsive to temperature changes within an enclosure adapted to make and break said circuit, an electric heating element positioned adjacent the thermostat to directly and continuously apply heat to the thermostat so as to select the temperature that it will function to maintain within the enclosure, an energizing circuit for said heating element, a rheostat in this heating circuit for determining the heat developed in the heating element, said rheostat comprising a movable resistance to one end of which one wire of the heating circuit is connected and a movable contact member engaging the resistance and to which the other circuit wire is connected, means responsive to temperature changes outside the enclosure and means responsive to changes in relative humidity of the air, one of these means moving the resistance longtitudinally of itself to change the point of engagement with the contact member, and the other means moving the contact member longitudinally of the resistance, so that the amount of resistance in circuit will be increased as the humidity decreases or the outside temperature rises, and will be decreased as the humidity increases or the outside temperature falls.

6. In combination with means for heating an enclosure, a temperature controlling circuit, a thermostat responsive to temperature changes within the enclosure adapted to make and break the circuit, a heating coil adapted to directly and continuously apply heat to the thermostat so as to select the temperature which it will function to maintain within the enclosure, an energizing circuit for said coil, a variable resistance in this heating circuit for determining the heat developed in the heating coil, and means responsive to temperature changes outside the enclosure for increasing the resistance as the outside temperature falls and decreasing the resistance as the outside temperature rises.

7. In combination with means for maintaining a desired temperature within an enclosure comprising a heating means and a cooling means, thermostatic means operating in response to changes in temperature outside the enclosure for selecting the heating means for operation when the outside temperature is below a predetermined temperance and for selecting the cooling means for operation when the outside temperature is above a predetermined temperature, a thermostat within the enclosure adapted to control the operation of the selected heating or cooling means in accordance with temperature changes inside the enclosure, a heating coil to directly and continuously apply heat to the thermostat so as to determine the temperature which it will function to maintain within the enclosure, an energizing circuit for said coil, and a pair of variable resistances adapted to be alternatively connected in the energizing circuit, said outside thermostatic means also functioning to place one of said resistances in the heating circuit when the cooling means is in operation and to increase this resistance as the outside temeprature rises and to decrease the resistance as the outside temperature falls, and said outside thermostatic means also functioning to connect the other resistance in the heating circuit when the heating means is in operation and to decrease this resistance as the outside temperature rises and to increase the resistance as the outside temperature falls.

8. In combination with means for maintaining a desired temperature within an enclosure comprising a heating means and a cooling means, thermostatic means operating in response to changes in temperature outside the enclosure for selecting the heating means for operation when the outside temperature is below a predetermined temperature and for selecting the cooling means for operation when the outside temperature is above a predetermined temperature, a thermostat within the enclosure adapted to control the operation of the selected heating or cooling means in accordance with temperature changes inside the enclosure, means for directly and continuously applying a heat correction to the thermostat so as to determine the temperature which it will function to maintain within the enclosure, said outside thermostatic means also controlling said last mentioned means so that the inside temperature will be increased as the outside temperature increases when the cooling means is in operation, and so that the inside temperature will be increased as the outisde temperature decreases when the heating means is in operation.

PAUL B. PARKS.
DONALD W. MILLER.